Oct. 10, 1961
E. H. LAND
3,003,391
COLOR IMAGE FORMATION IN WHICH ONLY ONE
COLOR FILTER IS EMPLOYED IN PROJECTION
Filed April 28, 1955
2 Sheets-Sheet 1
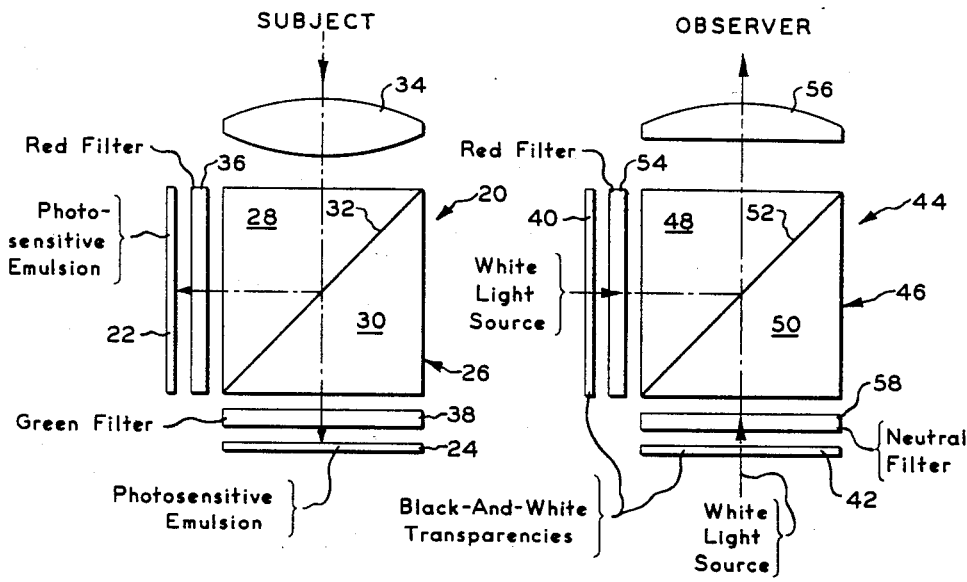
FIG. 1
FIG. 2
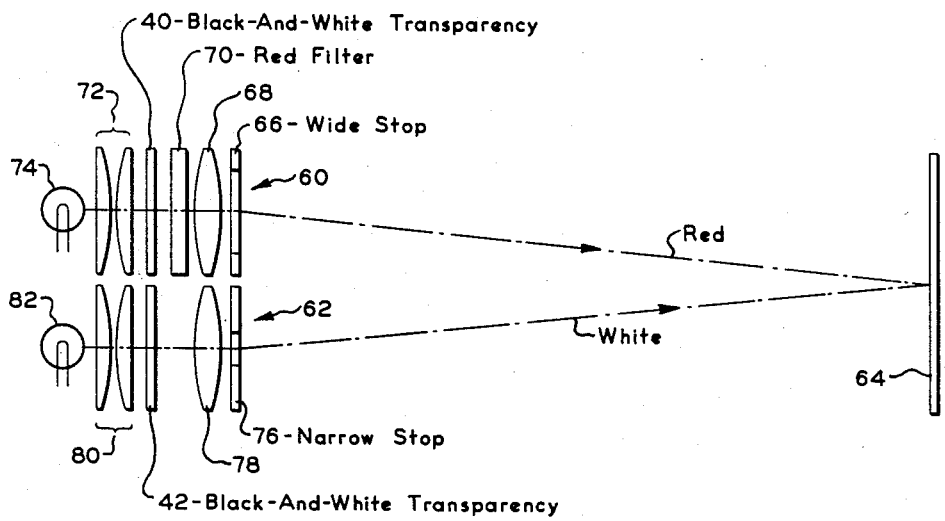
FIG. 3
INVENTOR
Edwin H. Land
BY Brown and Mikulka
and Gerald Altman
ATTORNEYS

United States Patent Office 3,003,391
Patented Oct. 10, 1961

3,003,391
COLOR IMAGE FORMATION IN WHICH ONLY ONE COLOR FILTER IS EMPLOYED IN PROJECTION
Edwin H. Land, Cambridge, Mass., assignor to Polaroid Corporation, Cambridge, Mass., a corporation of Delaware
Filed Apr. 28, 1955, Ser. No. 504,545
2 Claims. (Cl. 88—16.4)

This invention relates to color formation and, more particularly to the formation of a composite image of many colors from component images each of a different character.

This application is a continuation-in-part of my co-pending application Serial No. 415,510, filed March 11, 1954, now abandoned.

It is known that a multicolored image may be additively synthesized from two component images one of which is chromatic and the other of which is achromatic (Cornwell-Clyne, "Color Cinematography," Chapman & Hall, Ltd., London 1951). (As used herein, the term "chromatic" refers to light which produces a hued visual sensation such as red, orange, yellow, green, blue and violet, and the term "achromatic" refers to light which produces a substantially hueless or neutral visual sensation such as black, white and shades of gray.) For example, a multicolored subject is photographed through a red filter, and a black-and-white negative is produced which records, in terms of density, the red light emanating from a subject. From this negative is provided a first black-and-white positive transparency which records, in terms of lack of density, the red light emanating from the subject. Viewed in red light, an image of this transparency indicates the distribution of red light emanating from the subject. In like manner, the subject is photographed through a green filter and a second black-and-white positive transparency is provided which records, in terms of lack of density, the green light emanating from the subject. Now, if an image of the first transparency in red light and an image of the second transparency in white light are registered, the appearance of the subject is reproduced in full color.

It now has been discovered that if chromatic and achromatic images of the foregoing type are of substantially equal luminosity, the colors of their composite image are of wider spectral range and deeper saturation than the colors of other two-color composite images.

Accordingly, objects of the present invention are: to provide processes, devices and products for synthesizing a composite image from component, substantially equally luminous, images a first of which is in distinctly chromatic light and a second of which is in substantially achromatic light; and to provide processes, devices and products of the foregoing type wherein the first image, in reddish light, e.g., red or red-orange, represents a record of the reddish light emanating from a subject, and the second image, in white light, represents a record of the greenish light, e.g., green or green-blue, emanating from the subject.

Other objects of the invention will in part be obvious and will in part appear hereinafter.

The invention accordingly comprises the several steps and the relation and order of one or more of such steps with respect to each of the others, the product possessing the features, properties and relation of elements, and the devices possessing the construction, combination of elements and arrangement of parts which are exemplified in the following detailed disclosure, and the scope of the application of which will be indicated in the appended claims.

For a fuller understanding of the nature and objects of the invention, reference should be had to the following detailed description taken in connection with the accompanying drawings, wherein:

FIGURE 1 illustrates diagrammatically a taking system for producing latent images from which may be provided positive transparencies to be employed in accordance with the present invention;

FIG. 2 illustrates diagrammatically a viewing system for registering images of these positive transparencies in accordance with the present invention;

FIG. 3 illustrates diagrammatically a projecting system for registering images of these positive transparencies in accordance with the present invention;

Figure 4:
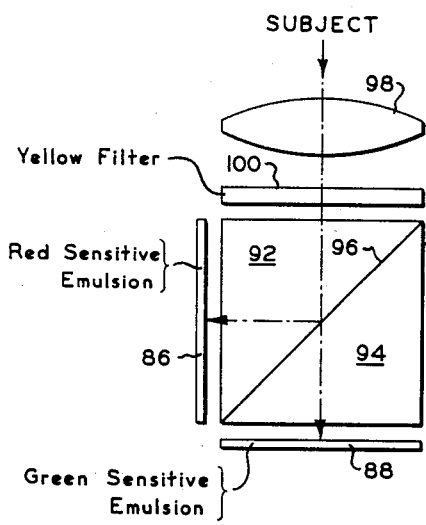
FIG. 4 illustrates diagrammatically an alternative taking system for producing latent images from which may be provided positive transparencies to be employed in accordance with the present invention.

In one example of a process of the herein contemplated type, the appearance of a bowl of fruit was reproduced, the bowl, in blonde wood against a gray-and-white checkered background, containing an orange, an apple, an avocado, a grapefruit, a banana and a cluster of grapes. The subject was photographed through a red filter (sold by Eastman Kodak under the designation Wratten 25) on a panchromatic emulsion from which was produced a black-and-white negative and, in turn, a first black-and-white positive transparency. The subject also was photographed through a green filter (sold by Eastman Kodak under the designation Wratten 57) on a panchromatic emulsion similar to that referred to above, from which was produced a black-and-white negative and, in turn, a second black-and-white positive transparency. When an image of the first transparency, illuminated by a 500 watt tungsten lamp and projected through a red filter (sold by Eastman Kodak under the designation Wratten 24) and an image of the second transparency, illuminated by a 300 watt tungsten lamp and projected in white light without a filter were registered, the scene was reproduced in a startling profusion of colors. The bowl appeared accurately blonde, the background sharply checkered in good gray and white, the orange excellently orange, the apple brightly red, the avocado acceptably green, the grapefruit and the banana appropriately yellow and the cluster of grapes in good purples.

With reference now to the drawings, FIG. 1 illustrates one of the many taking systems useful in producing latent images from which may be provided positive transparencies to be employed in accordance with the present invention. This system, generally designated by 20, mounts a pair of films 22 and 24, each for example comprising a panchromatic silver halide emulsion. System 20 comprises a prism assembly 26 which includes a pair of adjoining prism elements 28 and 30 at the interface of which is a partially reflecting, partially transmitting layer 32 for splitting two pencils from a beam of light emanating from a subject and refracted by an objective 34. One of these pencils is directed through a red filter 36 to film 22, and the other through a green filter 38 to film 24. From the latent images so formed in films 22 and 24 there may be produced in any suitable manner, for example by conventional processes of developing the negative and printing the positive or by reversal processes of the classical or the newer silver transfer-reversal type, two black-and-white positive transparencies 40 and 42, the former indicating, in terms of lack of density, the reddish light emanating from a subject and the latter indicating, in terms of lack of density, the greenish light emanating from a subject.

In FIG. 2 transparencies 40 and 42 are shown mounted within a viewing system generally designated by 44. This system comprises a prism assembly 46 which includes a pair of adjoining prism elements 48 and 50 at the interface of which is a partially reflecting, partially transmitting layer 52 for synthesizing a beam of light from two pencils emanating from transparencies 40 and 42. The first of these pencils is directed from a white light source, through transparency 40 and a reddish filter 54, and is reflected by layer 52 through a viewing glass 56 to the eyes of an observer. The second pencil is directed from a white light source, through black-and-white transparency 42, a neutral filter 58, layer 52 and viewing glass 56 to the eyes of the observer. Thus, images of transparencies 40 and 42 are registered by layer 52 to form a multicolored image which is observed through viewing glass 56. Here, the white light sources may be daylight, fluorescent light, tungsten lamplight, etc.

In FIG. 3 transparencies 40 and 42 are shown mounted within a projector which includes a pair of assemblies 60 and 62 for registering images of transparencies 40 and 42 on a screen 64. Assembly 60 includes a shutter 66 having an adjustable aperture, an objective 68, a red filter 70 adapted to transmit light primarily in the red region of the spectrum, a condenser 72 and a white light source, for example, a tungsten lamp 74. Assembly 62 includes a shutter 76 having an adjustable aperture, an objective 78, a condenser 80 and a white light source, for example, a tungsten lamp 82. It will be noted that assembly 72 is not provided with a colored filter. In operation the projector registers an image of transparency 40 in red light with an image of transparency 42 in white light to produce on screen 64 a multicolored composite image.

It will be apparent that the foregoing system can be used to project motion pictures in color where transparencies 40 and 42 are the corresponding frames of two motion picture films. It is preferable, however, in motion picture applications, to utilize a single film, each frame of which carries a pair of transparencies, one of which is a black-and-white record of the reddish light emanating from the subject and the other of which is a black-and-white record of the greenish light emanating from the subject. These transparencies, preferably in side-to-side relation, are projected by a suitable optical system, for example, similar to the systems shown for taking purposes in Chapter 5, particularly FIG. 34, of Friedman, "History of Color Photography," The American Photographic Publishing Company, Boston (1944).

When images of a pair of transparencies, such as those designated by 40 and 42, are rendered visible by means of light sources of the same brightness, the luminosity of the red light reaching the screen through the transparency recording red is substantially less than the luminosity of the white light reaching the screen through the transparency recording green. The colors of the composite image formed under these conditions appear in correct hue but with pronounced desaturation. As the brightness of the image of the transparency recording green is reduced, the colors of the composite image increase in saturation and eventually the overall hue of the composite image becomes excessively red. Optimum results are obtained when the luminosities of the red and white images are approximately equal. The luminosities of the red and white images may be compared, for example, by exposing a photometer or other means for measuring luminosity first to the entire red image and then to the entire white image. Roughly, if the original negatives have been given equivalent exposure, it has been found that the brightness of the white image should be reduced to from one-half to one-fifth that of the red image. While it is possible to effect a somewhat similar result by differentially exposing the negatives at the time of taking, this cannot be carried too far because it places the records of red and green on different portions of the characteristic curve of the photosensitive materials used. Furthermore, since light is wasted if the transparency controlling it is too dense, an economy can be effected simply by using less light to form the white image than to form the red image. In rendering the red and white images visible by means of either one light source or two, the luminosity of the white image can be controlled, for example, by a neutral filter as shown in FIG. 2 or by a diaphragm as shown in FIG. 3. Where two light sources are used, the light source for the white image may be weaker than that for the red as illustrated in the image formation of the bowl of fruit described above. In viewing images which, for example, have been illuminated by a single light source and superposed by a partially reflecting, partially transmitting mirror, relative brightness can be controlled by adjusting the reflectivity of the mirror to favor the red image.

The process of the present invention is extremely efficient in projection because light for the red image may be provided at low temperature by an incandescent source rich in red light, and light for the white image may be provided by an incandescent source which, although requiring high temperature, need be only of relatively low intensity. These considerations are responsible for a great increase in the life of projection lamps employed in accordance with the present invention. This use of projection lamps is in contrast to their use in classical processes where they must be run at high temperatures and, consequently, must waste a great deal of energy, particularly by absorption in the blue filter.

FIG. 4 illustrates another taking system useful in producing latent images from which may be provided positive transparencies to be employed in accordance with the present invention. This system, generally designated by 84, mounts a pair of films 86 and 88, the former comprising a red-sensitive emulsion and the latter a green-sensitive emulsion. System 84 comprises a prism assembly 90 which includes a pair of adjoining prism elements 92 and 94 at the interface of which is a partially reflecting, partially transmitting layer 96 for splitting two pencils from a beam of light emanating from a subject and refracted by an objective 98. A yellow filter 100 is provided for preventing blue light from striking films 86 and 88 which, like most emulsions, are sensitive to blue light.

Figure 5:
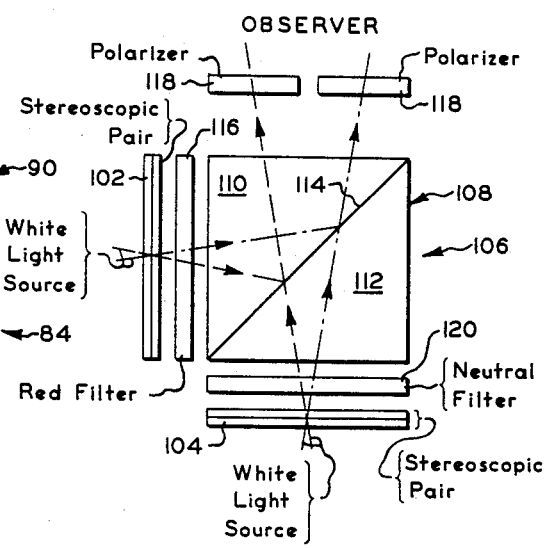
FIG. 5 illustrates diagrammatically a stereoscopic viewing system for utilizing stereoscopic pairs to give a multicolored stereoscopic picture in accordance with the present invention.

In FIG. 5, two stereoscopic pairs 102 and 104, of the type described by Edwin H. Land in an article entitled "Vectograph: Images in Terms of Vectorial Inequality and Their Application in Three-Dimensional Representation," Journal of the Optical Society of America, vol. 30, No. 6, 230–238, June 1949, are mounted within a viewing system generally designated by 106. Stereoscopic pair 102, as shown, comprises superposed left- and right-eye polarized records of the reddish light emanating from the subject. Stereoscopic pair 104, as shown, comprises superposed left- and right-eye polarized records of the greenish light emanating from the subject. System 106 comprises a prism assembly 108 which includes a pair of adjoining prism elements 110 and 112 at the interface of which is a partially reflecting, partially transmitting layer 114 for synthesizing beams of light from pencils emanating from stereoscopic pairs 102 and 104. Two of these pencils are directed from a white source through stereoscopic pair 102 and red filter 116 and are reflected by layer 114 through a suitable pair of polarizing left- and right-eye oculars 118 to the eyes of an observer. Two others of these pencils are directed from a white light source through stereoscopic pair 104, a neutral filter 120, layer 114 and oculars 118 to the eyes of the observer. Thus, corresponding stereoscopically related images of stereoscopic pairs 102 and 104 are rendered visible to an observer through oculars 118 to give a multicolored stereoscopic image.

Figure 6:
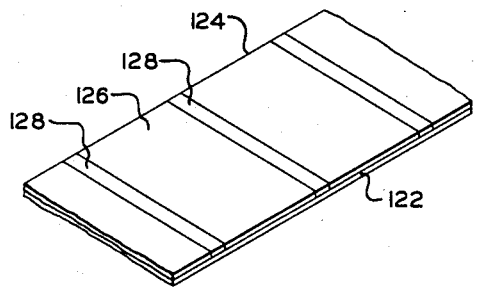
FIG. 6 illustrates the "color screen" formation of colored reproductions in accordance with the present invention.

The color screen formation of a colored reproduction, in accordance with the present invention, is illustrated in FIG. 6. There shown is a film which comprises a support 122 coated with an orthochromatic emulsion 124 (sensitive to blue and green). Broad stripes 126 of the emulsion are sensitized to red light and coated with a red dye. Narrow stripes 128 of the emulsion remain untreated. When this element is photoexposed through a pale yellow filter (which absorbs blue light), a latent image is formed in stripes 128 by incident green light and a latent image is formed in stripes 126 by incident red light. Positive records in situ in black and white of the latent images so formed are obtained by any suitable reversal process in stripes 126 and 128. When viewed in white light, these reversal records provide a multicolored image.

Figure 7:
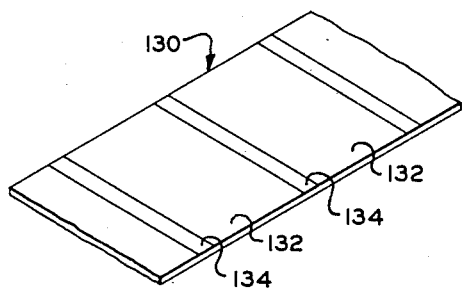
FIG. 7 illustrates the formation of colored reproductions by printing in accordance with the present invention.

FIG. 7 illustrates the formation of a colored reproduction by printing in accordance with the present invention. There shown is a product which comprises a suitable support 130 having laminated red and white stripes 132 and 134. A red-value record may be printed in black-and-white densities on the red stripes, for example with a black dye or ink which has no affinity for the material of the white stripes, and a green-value record may be printed in black-and-white densities on the white stripes, for example with a black dye or ink which has no affinity for the material of the red stripes. Now, when the surface of the product is viewed in white light, images of stripes 132 and 134 combine to form a multicolored image.

It is to be understood that a wide variety of interspersed regions, other than interspersed stripes, may be employed in the manner illustrated in FIGS. 6 and 7, e.g., dots, stripes and dots, etc. Of course, these regions are submacroscopic so that they cannot be resolved by the eye under normal conditions but rather give an overall effect of continuity. Preferably, the aggregate area of the red regions is from two to five times that of the white regions.

It is to be understood that a composite image of the present invention may be synthesized from component images produced in ways other than photographic. In particular, the component images may be produced by a television receiving tube which, for example, comprises, within a single envelope, an electron target having two types of cathode luminescent elements, one being designed to emit chromatic light and the other to emit achromatic light. The first type, in one form, emits reddish light in response to an electron beam controlled by signals which represent the reddish light emanating from the subject. The second type, in one form, emits white light in response to an electron beam controlled by signals which represent the greenish light emanating from the subject.

It is preferred, in accurately simulating the appearance of a subject in accordance with the present invention, to employ a first image in reddish light representing a record of the reddish light emanating from the subject and a second image in white light representing a record of the greenish light emanating from the subject. More specifically, best results are obtained when the reddish light is primarily of wavelengths above 552 millimicrons and the greenish light is primarily of wavelengths below 552 millimicrons. It will be noted that 552 millimicrons is at the peak of the curve of relative luminosity versus wavelength. Preferably, the reddish light in which the image is rendered visible is not identical to the recorded reddish light emanating from the subject, the former light being less orange than the latter. It is also to be mentioned that an analogous reproduction may be synthesized from a first image, in greenish light, representing a record of the greenish light emanating from the subject and a second image, in white light, representing a record of the reddish light emanating from the subject, although hues thus obtained are somewhat greenish. It is further to be mentioned that an acceptable reproduction may be synthesized from a first image, in reddish light, representing a record of the reddish light emanating from the subject and a second image, in white light, representing a record of the white, rather than the green, light emanating from the subject, although hues thus obtained are somewhat unsaturated.

The term "substantially achromatic light" is to be taken as including light of pale hue which is accepted by an observer as approximately white, e.g., skylight, sunlight, and tungsten lamplight. What amounts to a slight change in tungsten lamplight can be accomplished, for example, by a pale blue filter, a daylight glass or a dilute phthalocyanin filter. A pale filter for so modifying a source of white light is to be distinguished, for example, from a cyan filter which, as used in conventional three-color photography, substantially blocks red. Such a pale blue filter transmits red freely although not as freely as blue and green and is capable of increasing the saturation of blues formed in accordance with the present invention, without appreciably disturbing other hues.

In accordance with the present invention, it is possible to supplement the reddish and white component images, which represent the reddish and greenish light emanating from a subject, with a third blue component image, which represents the blue light emanating from the subject. It is to be emphasized, however, that the reddish and white images play a basically different role than does the blue image. In images formed by classical processes, green and red give yellow or orange which must be complemented by blue to form white. Here, in contrast, red and white appear as white where they are in the proper ratio, the role of the blue, when employed, being merely to increase the saturation of blues when desired.

There is thus provided a novel system for reproducing with high optical efficiency colors of primary importance in color photography. In its preferred form, the system requires for the synthesis of a final composite image two color records, which are rendered visible in substantially equally luminous chromatic and achromatic light. The system makes possible the simple, mechanical and optical design of a wide variety of taking and viewing arrangements.

Since certain changes may be made in the above processes, devices and products without departing from the scope of the invention herein involved, it is intended that all matter contained in the above description or shown in the accompanying drawings shall be interpreted as illustrative and not in a limiting sense.

What is claimed is:

1. A unitary optical system for providing a multicolored image of a photographic subject containing a plurality of colors, said system comprising prism means composed of a pair of adjoining, right prism elements having a partially light-reflecting and partially light-transmitting uncolored interface, substantially white light source means located adjacent said prism means providing the transmission of light rays along a pair of optical axes entering said respective prism elements, said axes being disposed substantially at 90° to one another and to entering faces of said prism elements and meeting at said interface, light rays of one of said axes being reflected from said interface and light rays of the other of said axes being transmitted by said interface so as to pass thence along a common optical axis which is an extension of said other of said axes, a black-and-white positive color-separation record of the long wavelength content of said subject positioned on one of said pair of optical axes, a black-and-white positive color-separation record of the short wavelength content of said subject positioned on the other of said pair of axes, colored filter means of relatively long wavelength transmission characteristics positioned on that one of said pair of optical axes on which is positioned said color-separation record of the long wavelength content of said photographic subject, and a neutral filter positioned on the other of said pair of optical axes on which is positioned said color-separation record of the short wavelength content of said photographic subject, said black-and-white records being visible as a multicolored composite image.

2. In combination with a pair of black-and-white positive color-separation records, one being a record of the long wavelength content of a multicolored photographic subject and the other being a record of its short wavelength content, an optical device in the form of a unitary structure for providing a multicolored image of said subject, comprising prism means composed of a pair of adjoining, right prism elements having a partially light-reflecting and partially light-transmitting uncolored interface, substantially white light source means located adjacent said prism means providing the transmission of light rays along a pair of optical axes entering said respective prism elements, said axes being disposed substantially at 90° to one another and to entering faces of said prism elements and meeting at said interface, light rays of one of said axes being reflected from said interface and light rays of the other of said axes being transmitted by said interface so as to pass thence along a common optical axis which is an extension of said other of said axes, each of said pair of black-and-white records being positioned on an individual one of said pair of optical axes, colored filter means of relatively long wavelength transmission characteristics positioned between said light source and prism means on that one of said pair of optical axes on which is positioned said color-separation record of the long wavelength content of said photographic subject, a neutral filter positioned on the other of said pair of optical axes between said light source and prism means, and a positive lens mounted on said common optical axis, said black-and-white records being seen as a multicolored image of said subject.

References Cited in the file of this patent

UNITED STATES PATENTS

| | | |
|---|---|---|
| 1,238,775 | Ives | Sept. 4, 1917 |
| 1,321,705 | Berwick | Nov. 11, 1919 |
| 1,416,645 | Jones | May 16, 1922 |
| 1,691,366 | Ames | Nov. 13, 1928 |
| 1,931,920 | Bernardi | Oct. 24, 1933 |
| 1,955,804 | Gualtierotti | Apr. 24, 1934 |
| 2,060,503 | Killman et al. | Nov. 10, 1936 |
| 2,182,142 | Ball et al. | Dec. 5, 1939 |
| 2,249,032 | O'Grady | July 15, 1941 |

FOREIGN PATENTS

| | | |
|---|---|---|
| 636 | Great Britain | of 1914 |
| 389,697 | Great Britain | Mar. 23, 1933 |
| 458,452 | Great Britain | Dec. 21, 1936 |
| 495,821 | Great Britain | Nov. 14, 1938 |

OTHER REFERENCES

"Color Cinematography," Cornwell-Clyne, London; Chapman & Hall, Ltd., 1951, pp. 264–268.